United States Patent Office.

JOHN A. McCLELLAND, OF LOUISVILLE, KENTUCKY.

Letters Patent No. 77,304, dated April 28, 1868.

IMPROVED MATERIAL FOR DENTAL PLATES AND FOR OTHER PURPOSES.

*The Schedule referred to in these Letters Patent and making part of the same.*

TO ALL WHOM IT MAY CONCERN:

Be it known that I, JOHN A. McCLELLAND, of Louisville, in the county of Jefferson, and State of Kentucky, have invented a new and improved Material for Dental Plates and for other Purposes; and I do hereby declare that the following is a full, clear, and exact description thereof, which will enable others skilled in the art to make and use the same.

This invention relates to a new and improved material for making dental plates, or the base of artificial teeth, and for other purposes; and it consists in an improved mode of preparing and working a compound formed of collodion, made of cotton or other fibres, and resins or gums, (so called,) which compound is subjected to peculiar treatment to produce a solid, homogeneous, massive substance in the form of dental plates or other shapes, as desired, applicable to the manufacture of many useful and ornamental objects in the arts, in the place of ivory, amber, ebony, horn, hard rubber, and other hard, tough, strong, and resilient substances, such, for example, as beads, buttons, and other articles in imitation of coral; mouth-pieces for pipes, handles of knives, canes and umbrellas, door-knobs, billiard-balls, keys of piano-fortes, &c., &c.

In the composition of my improved material for these and similar purposes, I employ collodion prepared in the usual way, by the treatment of cotton or other vegetable fibres with sulphuric and nitric acids, and well-known solvents, but although the pyroxyline is made fully soluble, the solution need be made only of the consistency of sirup.

To the collodion is added a solution of gum-copal, or other resinous substance, in any desired proportion, according to the nature and quality of the material to be produced, and the uses to which it is to be applied, taking care thoroughly to mix and incorporate the ingredients of the composition. Metallic oxides and coloring-matters may also be added to the solution, to give the material greater density, and impart any color or shade of color desired; and, further, in order to render the material quite uninflammable and neutralize the combustible nature of the ingredients, there may be also mixed with the solution a small portion of phosphate of ammonia or of magnesia, iodide of cadmium, peroxide of mercury, or the oxalate of lime.

The composition is then, after being allowed to settle and expel all the air that it may enclose, poured out upon a flat marble slab, or other hard, smooth substance, and dried by a gentle heat, which may be done in a kiln in connection with a still or retort for recovering the solvents. The residuum will then be in the form of thin sheets or plates. These dried sheets or plates of the composition, prepared as described, are then prepared by cutting or breaking them up into fine particles or grinding them into a powder, and when in this state they are ready for working into a massive solid material to form dental plates, or for other purposes, as previously described.

I am aware that collodion has been dried in sheets previously, and that it has also been combined with animal, vegetable, and mineral substances to produce various compounds, which in a pulpy condition have been dried in moulds or forms for the purpose of making various fabrics or articles of manufacture. But these attempts at working and employing collodion and its compounds in the arts for producing fabrics and articles of a massive solid material, have hitherto been unsuccessful, and this result is not practicable, and cannot be accomplished except by the method of preparing and working the material discovered and invented by me, and herein fully described, and distinguished from all previous attempts or known methods of treatment.

Pyroxyline in a pulpy condition, or only partially dissolved, so that it shall be merely softened or pulpified, has, I am aware, also been employed as a plastic material to mould into forms, either alone or combined with other substances; but all these known methods of working and applying pyroxyline or collodion and its compounds, are crude and defective, and are not productive of valuable practical results.

My improved methods of preparing and working collodion, and the compound formed by the combination of resinous substances, differ from these plans of treatment essentially, and are entirely different in results as respects the nature and quality of the material produced, and the value of its applications, particularly in the formation of dental plates.

The distinguishing feature of my invention is the comminution or reduction to a powder of the dried sheets or plates of collodion and its compounds, prepared as previously described, and then working and welding it into a solid massive and homogeneous material under pressure in moulds.

The next and final part of my process for forming the improved material for dental plates and other purposes is accomplished by a slight saturation of the powdered compound by treating it with ether and alcohol, or other suitable solvents, to render the fine particles adhesive, soft, and plastic, in which condition the material is placed in suitable moulds, and subjected to powerful pressure, and then cured or dried by the application of a moderate degree of heat, commencing at about 100° Fahrenheit, and gradually rising, in the course of twenty-four hours or more, to a temperature of about 150°, in order to thoroughly evaporate and dispel all traces of the solvents, and leave the material dry and solid.

By this means, the powdered material is welded as it were into a compact body, perfectly homogeneous and massive in its character.

For forming a dental plate in this manner, the powdered material is first introduced into a proper mould of the plate and teeth, for which purpose my improved sectional dental mould is especially adapted, and the material, when in the mould, is then saturated with ether and alcohol, or other suitable solvent, and subjected to strong pressure to force it into all the cavities of the mould, and between the interstices of the teeth.

The plate is cured in the same manner, by a slow and moderate application of heat. The plastic material surrounds and encloses the teeth, so that they are held strongly and firmly in the base, and in texture and color the material may be made perfect in its imitation of the natural gums.

But instead of forming the dental plate in this manner, by first introducing the dry-powdered material in the mould, it may be saturated with solvents to form an adhesive plastic body, and placed into the mould in that condition, when the subsequent treatment by pressure and evaporation of the solvents will be the same in order to cure and complete the dental plate.

In its massive form, this new material, thus prepared, of the dried sheets or plates of collodion and its compounds, as described, may be worked into various useful and beautiful forms by cutting-tools, and then polishing the surface.

Having described my invention, and the methods of carrying it out practically, what I claim as now, and desire to secure by Letters Patent, is—

1. The methods of preparing and working collodion and its compounds to form an improved material, substantially as herein described.

2. Forming dental plates of the improved material, prepared as herein described.

J. A. McCLELLAND.

Witnesses:
GEORG WILLIAM CARUTH,
E. D. TYLER.